US011264878B2

(12) United States Patent
Ikemoto et al.

(10) Patent No.: US 11,264,878 B2
(45) Date of Patent: Mar. 1, 2022

(54) ROTOR FOR ROTARY ELECTRIC MACHINE AND METHOD OF MANUFACTURING ROTARY ELECTRIC MACHINE

(71) Applicants: AISIN CORPORATION, Kariya (JP); AISIN SEIKI KABUSHIKI KAISHA, Kariya (JP)

(72) Inventors: Masayuki Ikemoto, Anjo (JP); Teppei Tsuda, Nagoya (JP); Masafumi Sakuma, Chiryu (JP)

(73) Assignees: AISIN CORPORATION, Kariya (JP); AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/342,132

(22) PCT Filed: Nov. 22, 2017

(86) PCT No.: PCT/JP2017/042050
§ 371 (c)(1),
(2) Date: Apr. 15, 2019

(87) PCT Pub. No.: WO2018/097193
PCT Pub. Date: May 31, 2018

(65) Prior Publication Data
US 2019/0260277 A1 Aug. 22, 2019

(30) Foreign Application Priority Data
Nov. 24, 2016 (JP) .............................. JP2016-228359

(51) Int. Cl.
*H02K 29/03* (2006.01)
*H02K 1/27* (2006.01)
(Continued)

(52) U.S. Cl.
CPC ............... *H02K 29/03* (2013.01); *H02K 1/22* (2013.01); *H02K 1/27* (2013.01); *H02K 1/276* (2013.01);
(Continued)

(58) Field of Classification Search
CPC ............ H02K 29/03; H02K 1/27; H02K 1/22; H02K 1/276; H02K 15/024; H02K 2201/06
(Continued)

(56) References Cited

U.S. PATENT DOCUMENTS 8,247,940 B2 * 8/2012 Hino .................. B60L 7/14
310/156.47
8,368,273 B2 * 2/2013 Hino .................. B60L 7/14
310/156.47
(Continued)

FOREIGN PATENT DOCUMENTS

CN 202395554 U 8/2012
CN 205081594 U 3/2016
(Continued)

OTHER PUBLICATIONS

Feb. 27, 2018 International Search Report issued in International Patent Application PCT/JP2017/042050.
(Continued)

*Primary Examiner* — John K Kim
(74) *Attorney, Agent, or Firm* — Oliff PLC

(57) ABSTRACT

A rotor for a rotary electric machine, wherein: magnet insertion holes are formed, each defined by the plurality of through holes communicating with each other in the axial direction across the plurality of magnetic sheets; and each of the permanent magnets is twisted about the center axis so as to be placed into a corresponding one of the magnet insertion holes, each having opposite ends in the axial direction that
(Continued)

are shifted from each other by an angle corresponding to the constant angle, from outside in the axial direction.

1 Claim, 5 Drawing Sheets

(51) Int. Cl.
*H02K 15/02* (2006.01)
*H02K 1/276* (2022.01)
*H02K 1/22* (2006.01)

(52) U.S. Cl.
CPC ....... *H02K 15/024* (2013.01); *H02K 2201/06* (2013.01)

(58) Field of Classification Search
USPC .................................................. 310/156.47
See application file for complete search history.

(56) References Cited

U.S. PATENT DOCUMENTS

| | | |
|---|---|---|
| 2005/0162790 A1 | 7/2005 | Yoshinaga |
| 2009/0224627 A1* | 9/2009 | Hino ..................... B60L 1/02 |
| | | 310/216.077 |
| 2011/0304235 A1* | 12/2011 | Hashiba ................. H02K 1/223 |
| | | 310/156.76 |
| 2013/0193783 A1* | 8/2013 | Aoyama ................. H02K 21/14 |
| | | 310/51 |
| 2014/0028141 A1* | 1/2014 | DuVal .................... H02K 15/09 |
| | | 310/183 |
| 2019/0140529 A1* | 5/2019 | Kawamoto ............. H02K 1/27 |
| 2019/0173339 A1* | 6/2019 | Takizawa ............... H02K 1/276 |
| 2019/0260277 A1* | 8/2019 | Ikemoto ................. H02K 1/22 |

FOREIGN PATENT DOCUMENTS

| | | |
|---|---|---|
| JP | H05-236687 A | 9/1993 |
| JP | 2001-25209 A | 1/2001 |
| JP | 2001-78401 A | 3/2001 |
| JP | 2015-115985 A | 6/2015 |
| JP | 2016-32356 A | 3/2016 |
| JP | 2010-81676 A | 4/2018 |

OTHER PUBLICATIONS

Jun Peng et al. "Study on Step Skewing of Rotor for Permanent Magnet Synchronous Motor". High Power Converter Technology, No. 1, p. 50-58, 2012.
English translation of Jul. 3, 2020 Office Action issued in Chinese Patent Application No. 201780070993.1.

* cited by examiner

ROTOR FOR ROTARY ELECTRIC MACHINE AND METHOD OF MANUFACTURING ROTARY ELECTRIC MACHINE

BACKGROUND

The present disclosure relates to a rotor for a rotary electric machine that includes a rotor core and permanent magnets embedded in the rotor core, and a method of manufacturing the same.

Japanese Patent Application Publication No. 2015-115985 (JP 2015-115985 A) discloses a rotor having a stepped skew structure as an example of a rotor for a rotary electric machine. Specifically, a rotor core (1) of a rotor (3) of JP 2015-115985 A is divided into a plurality of blocks in an axial direction. The blocks are shifted from one another in a circumferential direction so as to form a stepped skew. With such a stepped skew structure, it is possible to reduce cogging torque and torque ripple.

However, according to the configuration disclosed in JP 2015-115985 A, a plurality of permanent magnets arranged in the axial direction are shifted stepwise in units of blocks in the circumferential direction. Therefore, the effect of suppressing rapid changes in magnetic flux in the circumferential direction is limited, so that it is difficult to significantly reduce cogging torque and torque ripple.

SUMMARY

An exemplary aspect of the disclosure provides a rotor with a skew structure for further reducing cogging torque and torque ripple.

In view of the above, a rotor for a rotary electric machine, the rotor including a rotor core and permanent magnets embedded in the rotor core, wherein: the rotor core includes a stacked structure including a plurality of magnetic sheets stacked in an axial direction along a center axis; each of the plurality of magnetic sheets has through holes for insertion of the permanent magnets at a plurality of positions in a circumferential direction; a relative positional relationship of the plurality of through holes with respect to the center axis and shapes of the through holes in each of the magnetic sheets are common to the plurality of magnetic sheets; the stacked structure is configured such that the plurality of magnetic sheets are shifted in position from one another by a constant angle to one side in the circumferential direction with increasing distance to one side in the axial direction; magnet insertion holes are formed, each defined by the plurality of through holes communicating with each other in the axial direction across the plurality of magnetic sheets; and each of the permanent magnets is twisted about the center axis so as to be placed into a corresponding one of the magnet insertion holes, each having opposite ends in the axial direction that are shifted from each other by an angle corresponding to the constant angle, from outside in the axial direction.

According to the above characteristic configuration, the rotor core includes the stacked structure configured such that the plurality of magnetic sheets are shifted in position from one another by a constant angle to one side in the circumferential direction with increasing distance to one side in the axial direction, and the magnet insertion holes are formed, each defined by the plurality of through holes communicating with each other in the axial direction across the plurality of magnetic sheets. Accordingly, it is possible to form a continuous skew structure divided into the same number of portions as the number of magnetic sheets in the stacked structure, and to further reduce cogging torque and torque ripple while suppressing a reduction in performance of the rotary electric machine such as a reduction in output torque.

Further, according to the above configuration, each of the permanent magnets is twisted about the center axis so as to be placed into a corresponding one of the magnet insertion holes from the outside in the axial direction. Therefore, it is possible to use the permanent magnets each having a continuous shape in the axial direction while forming the continuous skew structure in the stacked structure as described above. Accordingly, it is possible to suppress an increase in the number of components while providing a continuous skew structure.

Thus, according to the above configuration, it is possible to provide the rotor with a skew structure for further reducing cogging torque and torque ripple.

There is provided a rotor for a rotary electric machine, the rotor including a rotor core and permanent magnets embedded in the rotor core. The rotor core includes a stacked structure including a plurality of magnetic sheets stacked in an axial direction along a center axis. Each of the plurality of magnetic sheets has through holes for insertion of the permanent magnets at a plurality of positions in a circumferential direction. A relative positional relationship of the plurality of through holes with respect to the center axis and shapes of the through holes in each of the magnetic sheets are common to the plurality of magnetic sheets. The stacked structure is configured such that the plurality of magnetic sheets are shifted in position from one another by a constant angle to one side in the circumferential direction with increasing distance to one side in the axial direction. Magnet insertion holes are formed, each defined by the plurality of through holes communicating with each other in the axial direction across the plurality of magnetic sheets. A cross-section of each of the permanent magnets orthogonal to the center axis is defined as a magnet cross-section, and positions of gravity centers of magnet cross-sections at respective positions in the axial direction corresponding to the plurality of magnetic sheets are defined as corresponding gravity center positions. A distance between each of the corresponding gravity center positions and the center axis in the radial direction is constant throughout a length of each of the permanent magnets in the axial direction. The corresponding gravity center positions are shifted from one another by the same angle as the constant angle to the one side in the circumferential direction with increasing distance to the one side in the axial direction.

According to this configuration, the rotor core includes the stacked structure configured such that the plurality of magnetic sheets are shifted in position from one another by a constant angle to one side in the circumferential direction with increasing distance to one side in the axial direction, and the magnet insertion holes are formed, each defined by the plurality of through holes communicating with each other in the axial direction across the plurality of magnetic sheets. Accordingly, it is possible to form a continuous skew structure divided into the same number of portions as the number of magnetic sheets in the stacked structure, and to further reduce cogging torque and torque ripple while suppressing a reduction in performance of the rotary electric machine such as a reduction in output torque.

Further, according to the above configuration, the permanent magnets have continuous shapes in the axial direction corresponding to the shapes of the respective magnet insertion holes in the stacked structure having the continuous skew structure as described above, and therefore it is possible to further reduce cogging torque and torque ripple.

Thus, according to the above configuration, it is possible to provide the rotor with a skew structure for further reducing cogging torque and torque ripple.

In view of the above, a method of manufacturing a rotor for a rotary electric machine, the rotor including a rotor core and permanent magnets embedded in the rotor core, is characterized in that the method includes: a preparation step of preparing the rotor core and the permanent magnets; and a magnet insertion step of inserting the permanent magnets into the rotor core, in which: the rotor core includes a stacked structure including a plurality of magnetic sheets stacked in an axial direction along a center axis; each of the plurality of magnetic sheets has through holes for insertion of the permanent magnets at a plurality of positions in a circumferential direction; a relative positional relationship of the plurality of through holes with respect to the center axis and shapes of the through holes in each of the magnetic sheets are common to the plurality of magnetic sheets; the stacked structure is configured such that the plurality of magnetic sheets are shifted in position from one another by a constant angle to one side in the circumferential direction with increasing distance to one side in the axial direction; magnet insertion holes are formed, each defined by the plurality of through holes communicating with each other in the axial direction across the plurality of magnetic sheets; each of the permanent magnets is twisted about the center axis so as to be insertable into a corresponding one of the magnet insertion holes from outside in the axial direction; and in the magnet insertion step, the permanent magnets are moved in the axial direction while being rotated about the center axis with respect to the stacked structure.

According to the above characteristic configuration, the rotor can be manufactured by appropriately inserting the permanent magnets, each being twisted about the center axis so as to be insertable into a corresponding one of the magnet insertion holes from outside in the axial direction, into the stacked structure configured such that the plurality of magnetic sheets are shifted in position from one another by a constant angle to one side in the circumferential direction with increasing distance to one side in the axial direction, in the magnet insertion step. That is, the rotor is manufactured using the permanent magnets each having a continuous shape in the axial direction while forming a continuous skew structure divided into the same number of portions as the number of magnetic sheets in the stacked structure, and therefore the magnet insertion step can be simplified as compared with the case of using permanent magnets divided in the axial direction as the permanent magnets.

Further, according to the above characteristic configuration, it is possible to appropriately manufacture a rotor having a skew structure for further reducing cogging torque and torque ripple as described above.

DETAILED DESCRIPTION OF EMBODIMENTS

An embodiment of a rotor for a rotary electric machine and a method of manufacturing the same will be described with reference to the drawings. In the following description, an "axial direction L", a "radial direction R", and a "circumferential direction C" are defined with reference to a center axis A (see, for example, FIG. 1) of a rotor for a rotary electric machine (hereinafter referred to as a "rotor 2"). The center axis A is a virtual axis, and the rotor 2 rotates about the center axis A. Further, as illustrated in, for example, FIG. 4, one side in the axial direction L is referred to as a "first axial side L1", and the other side in the axial direction L (the side opposite to the first axial side L1) is referred to as a "second axial side L2". Further, one side in the circumferential direction C is referred to as a "first circumferential side C1", and the other side in the circumferential direction C (the side opposite to the first circumferential side C1) is referred to as a "second circumferential side C2". The terms related to the size, arrangement direction, arrangement position, and so on as used herein may allow differences due to errors (acceptable manufacturing errors).

Figure 1:
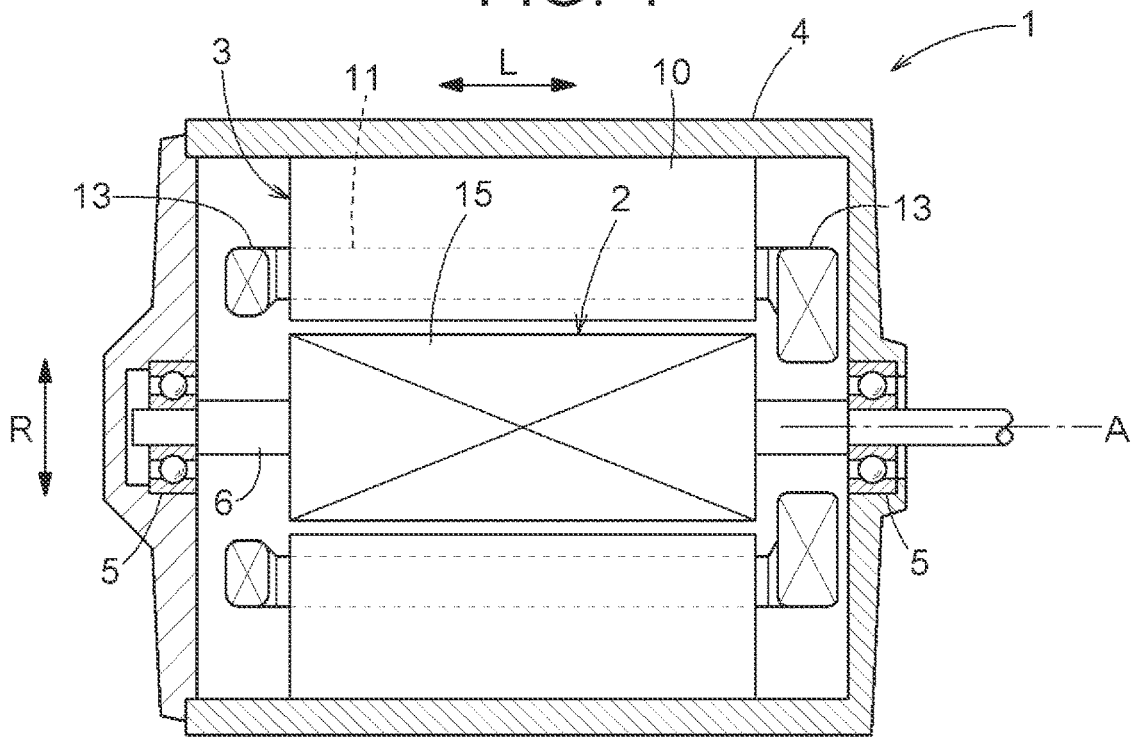
FIG. 1 is a diagram illustrating a rotary electric machine according to an embodiment.

As illustrated in FIG. 1, a rotary electric machine 1 includes the rotor 2 and a stator 3. That is, the rotor 2 is a rotor for a rotary electric machine. The rotary electric machine 1 is accommodated in a case 4. A stator core 10 serving as a core for the stator 3 is fixed to the case 4 (the inner surface of the case 4 in the example of FIG. 1). The rotor 2 is supported rotatably with respect to the case 4. Specifically, the rotary electric machine 1 includes a rotor shaft 6 that is supported rotatably with respect to the case 4 via bearings 5, and a rotor core 15 serving as a core for the rotor 2 is coupled to the rotor shaft 6 to rotate therewith. The rotor shaft 6 is inserted into an insertion hole 33 (see FIG. 4) extending in the axial direction L through the center of the rotor core 15 in a radial direction R.

The rotor core 15 is disposed to face the stator core 10 in the radial direction R. In the present embodiment, the rotary electric machine 1 is an inner rotor type rotary electric machine. That is, in the present embodiment, the rotor 2 is a rotor for an inner rotor type rotary electric machine, and the rotor 2 is disposed on an inner side with respect to the stator 3 (stator core 10) in the radial direction R so as to overlap the stator 3 (stator core 10) when viewed in the radial direction R. The rotary electric machine 1 is a revolving field type rotary electric machine, and a coil 13 is wound around the stator core 10. Thus, the rotor 2 serving as a field system is rotated by a magnetic field generated from the stator 3. The term "rotary electric machine" as used herein refers to any of a motor (electric motor), a generator (electric generator), and a motor generator that serves as both a motor and a generator as necessary.

Figure 2:
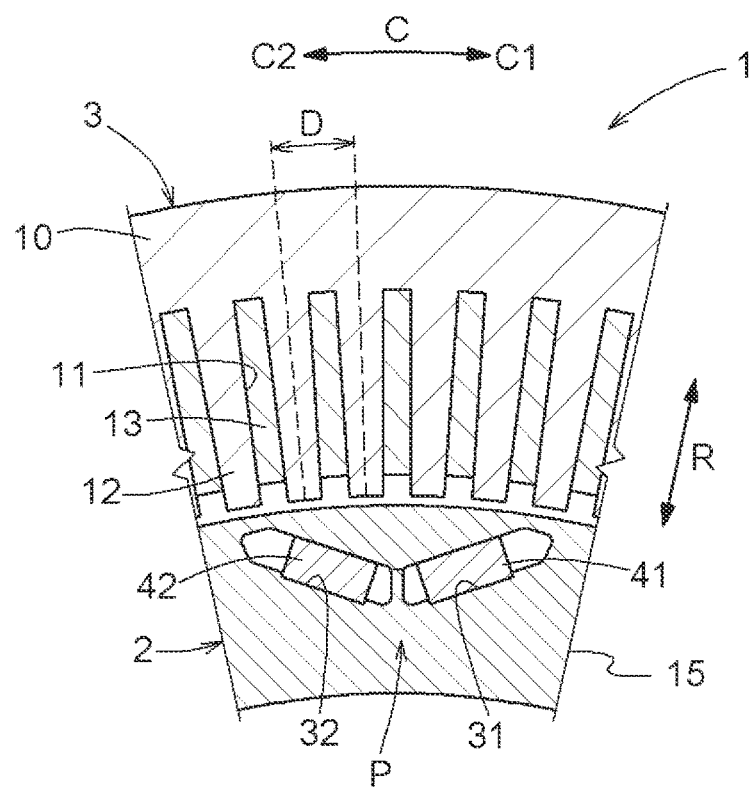
FIG. 2 is a cross-sectional view illustrating a part of the rotary electric machine in a direction orthogonal to an axial direction according to the embodiment.

As illustrated in FIG. 2, the stator core 10 has a plurality of slots 11 in the circumferential direction C, each extending in the axial direction L. The plurality of slots 11 are arranged at constant intervals (that is, at a constant arrangement pitch D) in the circumferential direction C. Each of the slots 11 is open at both ends in the axial direction L, and is open inwardly in the radial direction R. A tooth 12 extending inwardly in the radial direction R from a main body portion (yoke portion) that is continuous in the circumferential direction C is formed between each two adjacent slots 11 in the circumferential direction C. That is, the stator core 10 includes a plurality of teeth 12 formed in the circumferential direction C, each extending in the axial direction L. The plurality of teeth 12 are arranged at constant intervals (that is, at the constant arrangement pitch D) in the circumferential direction C. The arrangement pitch D is an angle with respect to the center axis A.

Figure 4:
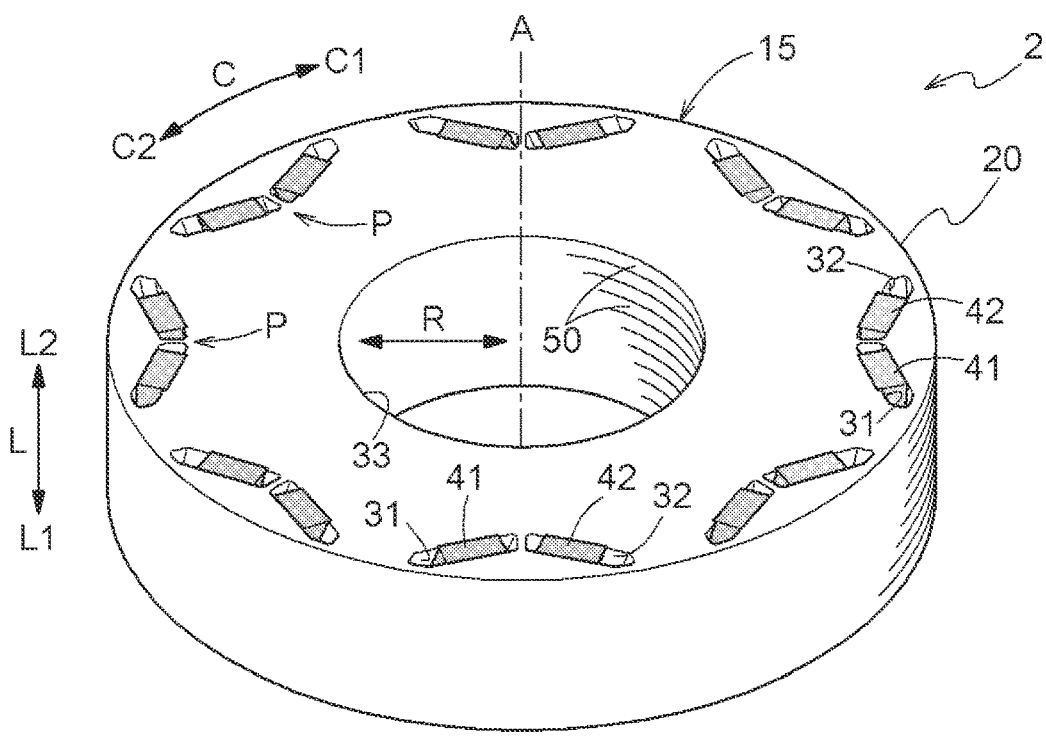
FIG. 4 is a perspective view illustrating a rotor according to the embodiment.

As illustrated in FIGS. 2 and 4, the rotor 2 includes the rotor core 15, and permanent magnets embedded in the rotor core 15. That is, the rotor 2 is a rotor used for an interior permanent magnet rotary electric machine (for example, synchronous electric motor). The rotor core 15 has magnet insertion holes for insertion of the permanent magnets. The magnet insertion holes extend through the rotor core 15 in the axial direction L. In the present embodiment, each of a plurality of magnetic poles P formed in the circumferential direction C is formed by a pair of permanent magnets arranged side by side in the circumferential direction C. One permanent magnet of a pair of permanent magnets forming one magnetic pole P on the first circumferential side C1 is referred to as a first permanent magnet 41, and the other permanent magnet on the second circumferential side C2 is referred to as a second permanent magnet 42. Further, a magnet insertion hole for insertion of the first permanent magnet 41 is referred to as a first magnet insertion hole 31, and a magnet insertion hole for insertion of the second permanent magnet 42 is referred to as a second magnet insertion hole 32. The first permanent magnet 41 and the second permanent magnet 42 may hereinafter collectively be referred to as permanent magnets (41, 42) when their common configuration is described. Further, the first magnet insertion hole 31 and the second magnet insertion hole 32 may hereinafter collectively be referred to as magnet insertion holes (31, 32) when their common configuration is described.

As illustrated in FIG. 2, in each cross-section orthogonal to the axial direction L, the first permanent magnet 41 and the second permanent magnet 42 forming one magnetic pole P are symmetric with respect to a line as a symmetry axis passing through the center of the magnetic pole P in the circumferential direction C in that cross-section and extending parallel to the radial direction R. Accordingly, the first magnet insertion hole 31 and the second magnet insertion hole 32 for insertion of the first permanent magnet 41 and the second permanent magnet 42 forming one magnetic pole P are symmetric with respect to the line as a symmetry axis described above in each cross-section orthogonal to the axial direction L. Specifically, in the present embodiment, the first permanent magnet 41 and the second permanent magnet 42 forming one magnetic pole P are arranged in a V-shape such that the distance therebetween increases outward in the radial direction R, in a cross-section orthogonal to the axial direction L. Further, the first permanent magnet 41 and the second permanent magnet 42 forming one magnetic pole P are arranged such that their magnetic pole faces of the same polarity (N-pole or S-pole) face outward in the radial direction R. Two adjacent magnetic poles P in the circumferential direction C have polarities opposite to each other. By arranging the permanent magnets (41, 42) in the manner described above, the rotary electric machine 1 according to the present embodiment can use reluctance torque generated due to the saliency (Ld<Lq) between q-axis inductance (Lq) and d-axis inductance (Ld), in addition to magnet torque generated by interlinkage magnetic flux (coil interlinkage magnetic flux) of the permanent magnets (41, 42).

Part or all of each magnet insertion hole (31, 32) is a magnet arrangement area where the permanent magnet (41, 42) is arranged, in a cross-section orthogonal to the axial direction L. In the present embodiment, only part of the magnet insertion hole (31, 32) is a magnet arrangement area, in a cross-section orthogonal to the axial direction L. Specifically, as illustrated in FIG. 2, the magnet insertion hole (31, 32) has an area serving as a magnetic resistance (flux barrier) with respect to a magnetic flux flowing inside the rotor core 15, at each end of the magnet arrangement area where the permanent magnet (41, 42) is arranged in the direction along the magnetic pole faces, in a cross-section orthogonal to the axial direction L. This area is a clearance, or is filled with a filler (such as resin) having a permeability lower than a magnetic sheet 50 (described below). In the present embodiment, the shape of each permanent magnet (41, 42) in a cross-section orthogonal to the axial direction L is rectangular, and the direction along the long side of the rectangular cross-section is the direction along the magnetic pole face.

As illustrated in FIG. 4, the rotor core 15 includes a stacked structure 20 in which a plurality of magnetic sheets 50 are stacked in the axial direction L along the center axis A. In the present embodiment, the rotor core 15 includes one stacked structure 20. The magnetic sheets 50 are electromagnetic steel sheets, for example. The plurality of magnetic sheets 50 have an equal thickness (thickness in the axial direction L). Note that in FIG. 4 and FIGS. 7, 9, and 10 to be referred to below, the ratio of the thickness of the magnetic sheets 50 to the thickness of the rotor core 15 does not necessarily accurately represent the actual ratio. Further, each magnetic sheet 50 does not have to be physically one magnetic sheet. Each magnetic sheet 50 may be formed of magnetic sheets having the same shape and stacked in the same phase in the axial direction L.

Figure 3:
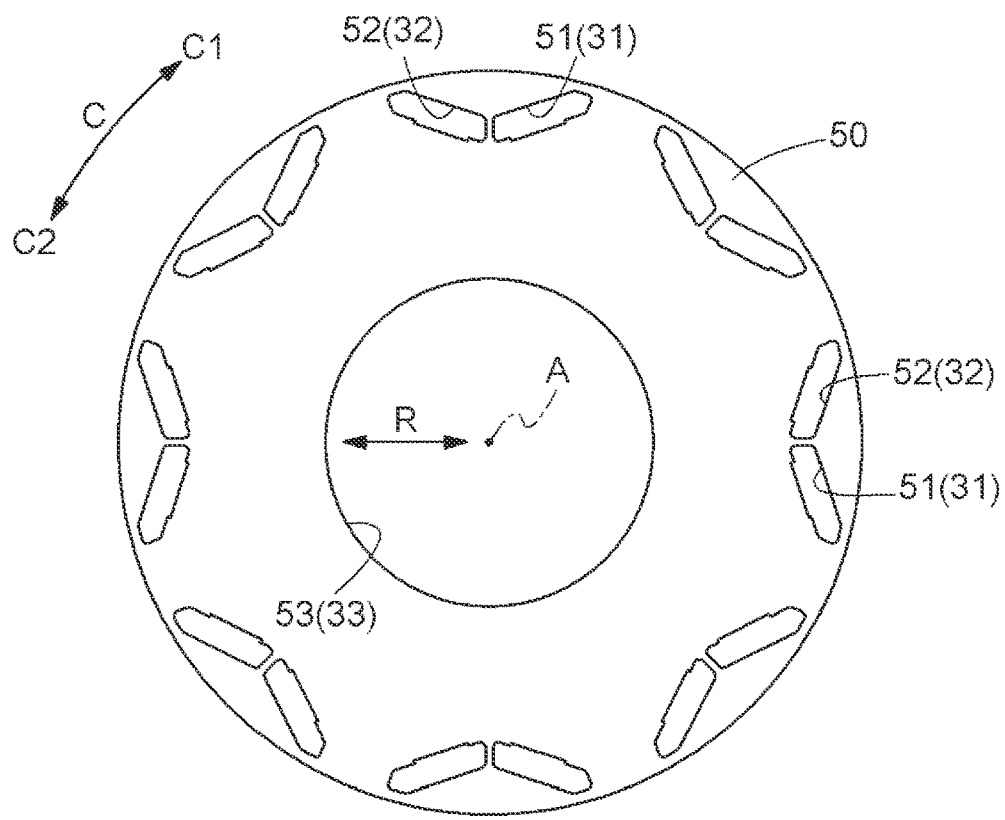
FIG. 3 is a diagram illustrating a magnetic sheet as viewed in an axial direction according to the embodiment.

As illustrated in FIG. 3, each of the plurality of magnetic sheets 50 has through holes for insertion of the permanent magnets (41, 42) at a plurality of positions in the circumferential direction C. In the present embodiment, each magnetic sheet 50 includes first through holes 51 as through holes for insertion of the first permanent magnets 41, and second through holes 52 as through holes for insertion of the second permanent magnets 42. The first through holes 51 and the second through holes 52 may hereinafter collectively be referred to as through holes (51, 52) when their common configuration is described. Each magnetic sheet 50 includes the same number of pairs of a first through hole 51 and a second through hole 52 as the number of magnetic poles P at a plurality of positions in the circumferential direction C. Each magnetic sheet 50 also includes a third through hole 53 for insertion of the rotor shaft 6 (see FIG. 1) at the center in the radial direction R. Each magnetic sheet 50 is formed such that the outer peripheral surface has a circular shape when viewed in the axial direction L. That is, each magnetic sheet 50 is formed in an annular plate shape, and has the through holes (51, 52) between the inner peripheral surface and the outer peripheral surface in the radial direction R. Each of the first through holes 51, the second through holes 52, and the third through hole 53 is formed to extend through the magnetic sheet 50 in the axial direction L. Further, each of the first through holes 51, the second through holes 52, and the third through hole 53 is formed not to be open in the direction orthogonal to the axial direction L (that is, formed to be closed throughout the circumference when viewed in the axial direction L).

The relative positional relationship of the plurality of through holes (51, 52) with respect to the center axis A and shapes of the through holes (51, 52) in each of the magnetic sheets 50 are common to the plurality of magnetic sheets 50. That is, the plurality of magnetic sheets 50 are formed such that the through holes (51, 52) having the same shape are arranged at the same position when stacked in the axial direction L with their phases aligned in the circumferential direction C. Specifically, in the case where each magnetic pole P is formed by a single permanent magnet, each of the plurality of magnetic sheets 50 has through holes, one for each magnetic pole P, at constant intervals in the circumferential direction C (the same intervals in the circumferential direction C as the magnetic poles P), and the shapes and the positions in the radial direction R of the respective through holes are common to the plurality of magnetic sheets 50. Further, in the case where each magnetic pole P is formed by a plurality of permanent magnets, each of the plurality of magnetic sheets 50 includes sets of a plurality of through holes, one set for each magnetic pole P, at constant intervals in the circumferential direction C (the same intervals in the circumferential direction C as the magnetic poles P), and the shapes and the positions in the radial direction R of the respective through holes of each set of a plurality of through holes, and the relative positional relationship between the plurality of through holes in the circumferential direction C are common to the plurality of magnetic sheets 50. Further, the inner diameter of the third through hole 53 is common to the plurality of magnetic sheets 50. For example, the stacked structure 20 may be formed of a plurality of magnetic sheets 50 having the same shape.

Further, in the stacked structure 20, the plurality of magnetic sheets 50 are shifted in position (phase) from one another by a constant angle to one side in the circumferential direction C with increasing distance to one side in the axial direction L. This stacked structure 20 is formed by stacking the plurality of magnetic sheets 50 in a manner such that the magnetic sheets 50 are shifted from one another to one side in the circumferential direction C, or by adjusting the phases of the magnetic sheets 50 after stacking the plurality of magnetic sheets 50 with their phases aligned. In the example illustrated in FIG. 4, a plurality of magnetic sheets 50 are shifted in position from one another by a constant angle to the first circumferential side C1 with increasing distance to the first axial side L1. The constant angle is set to an angle in the range (hereinafter referred to as a "first angle range") where there is an overlap between the through holes (between the first through holes 51, and between the second through holes 52) formed in two adjacent magnetic sheets 50 in the axial direction L when the magnetic sheets 50 are viewed in the axial direction L. In the case where the first angle range includes an angle range where there is an overlap between the first through hole 51 formed in one of the two adjacent magnetic sheets 50 in the axial direction L and the second through hole 52 formed in the other when the magnetic sheets 50 are viewed in the axial direction L, the constant angle is set to the first angle range excluding this angle range.

When the plurality of magnetic sheets 50 forming a single stacked structure 20 are arranged in the manner described above, the magnet insertion holes (31, 32) are formed, each defined by the plurality of through holes (51, 52) communicating with each other in the axial direction L across the plurality of magnetic sheets 50. Further, the plurality of through holes (51, 52) forming a single magnet insertion hole (31, 32) are shifted in position from one another by a constant angle to one side in the circumferential direction C with increasing distance to one side in the axial direction L. In the present embodiment, the first magnet insertion hole 31 is defined by the plurality of first through holes 51 communicating with each other in the axial direction L across the plurality of magnetic sheets 50, and the second magnet insertion hole 32 is defined by the plurality of second through holes 52 communicating with each other in the axial direction L across the plurality of magnetic sheets 50. Further, the plurality of third through holes 53 communicating with each other in the axial direction L throughout the plurality of magnetic sheets 50 form the insertion hole 33 for insertion of the rotor shaft 6.

Figure 5:
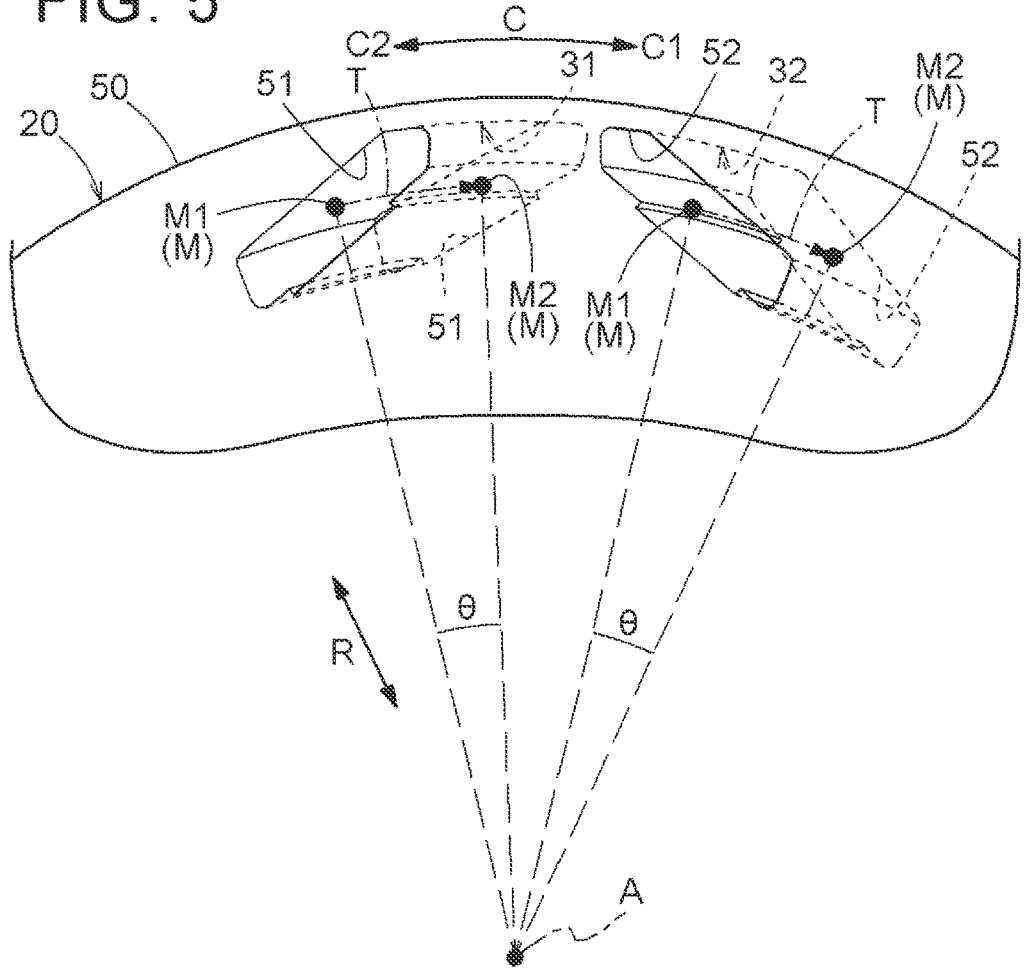
FIG. 5 is a diagram illustrating a part of a stacked structure as viewed in an axial direction according to the embodiment.

As illustrated in FIG. 5, the plurality of first through holes 51 forming a single first magnet insertion hole 31 are shifted in position from one another by a constant angle to the first circumferential side C1 with increasing distance to the first axial side L1, and the plurality of second through holes 52 forming a single second magnet insertion hole 32 are shifted in position from one another by a constant angle to the first circumferential side C1 with increasing distance to the first axial side L1. In FIG. 5, only the first magnet insertion hole 31 for forming a single magnetic pole P, and the second magnet insertion hole 32 for forming a magnetic pole P adjacent on the first circumferential side C1 to that magnetic pole P are illustrated for purposes of simplicity. In FIG. 5, the through hole (51, 52) of the top magnetic sheet 50 on the second axial side L2 is indicated by the continuous line, and the through hole (51, 52) of the top magnetic sheet 50 on the first axial side L1 is indicated by the dashed line. In FIG. 5, the angle denoted by θ represents a position shift amount in the circumferential direction C between the opposite ends of each magnet insertion hole (31, 32) in the axial direction L. When the number of magnetic sheets 50 forming a single stacked structure 20 is "N", the position shift amount θ is obtained by multiplying the constant angle by (N−1).

Preferably, the position shift amount θ is set such that a relative skew amount of the rotor core 15 with respect to the stator core 10 is equal to the arrangement pitch D. When a relative position in the circumferential direction with respect to an end of the tooth 12 on the rotor core 15 side in the radial direction R (an inner end in the radial direction R in the present embodiment) is defined as an object relative position, the relative skew amount is a shift amount between the object relative positions of the opposite ends of each magnet insertion hole (31, 32) in the axial direction L. The object relative position may be, for example, a relative position with respect to the center position of the end of the tooth 12 in the circumferential direction C. In the present embodiment, the stator core 10 does not have a skew structure, and therefore the relative skew amount (the shift amount between the object relative positions) is equal to the position shift amount θ. In the case where the stator core 10 has a skew structure, the stator core 10 may have a skew structure skewed in the opposite direction to the skew structure of the rotor core 15. In the case where such a configuration is adopted in the present embodiment, the stator core 10 has a skew structure that extends to the second circumferential side C2 as the end of the tooth 12 extends to the first axial side L1. In the case where the stator core 10 has a skew structure (for example, the skew structure skewed in the opposite direction) as descried above, a value different from the arrangement pitch D (that is, a value greater than or equal to the arrangement pitch D or a value less than or equal to the arrangement pitch D) may be a preferable value of the position shift amount θ.

Figure 6:
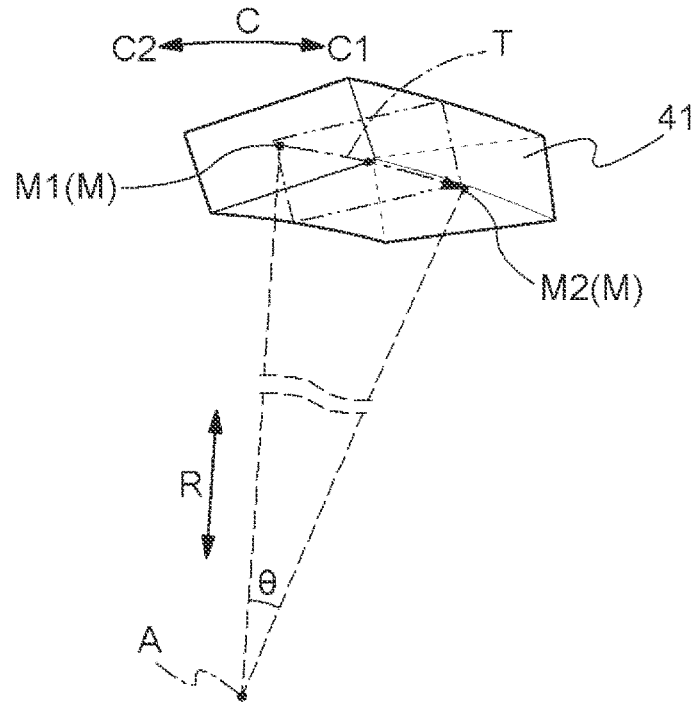
FIG. 6 is a diagram illustrating a permanent magnet as viewed in an axial direction according to the embodiment.

Each of the permanent magnets (41, 42) is twisted about the center axis A so as to be placed into a corresponding one of the magnet insertion holes (31, 32), each having opposite ends in the axial direction (L) that are shifted from each other by an angle (in this case, the position shift amount θ) corresponding to the constant angle, from the outside in the axial direction A. In other words, each of the permanent magnets (41, 42) is twisted about the center axis A so as to be insertable into a corresponding one of the magnet insertion holes (31, 32) from the outside in the axial direction L. That is, the permanent magnets (41, 42) have shapes that match the shapes of the respective magnet insertion holes (31, 32). Specifically, each of the permanent magnets (41, 42) is formed such that a cross-sectional shape orthogonal to the axial direction L is constant in the axial direction L. In the present embodiment, as illustrated in FIG. 6, the shape of the permanent magnet (41, 42) in a cross-section orthogonal to the axial direction L is a rectangle at every position in the axial direction L, and the length of the long side of the rectangle is constant in the axial direction L, and the length of the short side of the rectangle is constant in the axial direction L. Here, the cross-section of the permanent magnet (41, 42) orthogonal to the center axis A is defined as a magnet cross-section, and the shape of the magnet cross-section when viewed in the axial direction L is defined as a cross-sectional shape. Further, the expression "constant in the axial direction L" means being constant throughout the length in the axial direction L. That is, the cross-sectional shape of the permanent magnet (41, 42) is constant throughout the length of the permanent magnet (41, 42) in the axial direction L. Accordingly, as for the length of the long side of the rectangle, the length of the long side of the rectangle is constant throughout the length of the permanent magnet (41, 42) in the axial direction L. Further, as for the length of the short side of the rectangle, the length of the short side of the rectangle is constant throughout the length of the permanent magnet (41, 42) in the axial direction L.

Further, the permanent magnet (41, 42) is twisted about the center axis A at a constant rate with increasing distance to one side in the axial direction L, and the amount of twist about the center axis A between the opposite ends in the axial direction L is equal to the position shift amount θ described above as illustrated in FIG. 6. Further, when the positions of gravity centers M of magnet cross-sections at respective positions in the axial direction L corresponding to the plurality of magnetic sheets 50 are defined as corresponding gravity center positions, the corresponding gravity center positions are shifted from one another by the same angle as the constant angle to the first circumferential side C1 with increasing distance to the first axial side L1.

Further, the distance between each of the corresponding gravity center positions and the center axis A in the radial direction is constant throughout the length of the permanent magnet (41, 42) in the axial direction L. In other words, when a gravity center M of the magnet cross-section at the end of the rotor core 15 on the first axial side L1 is defined as a first gravity center M1 and a gravity center M of the magnet cross-section at end of the rotor core 15 on the second axial side L2 is defined as a second gravity center M2, the distance from the center axis A in the radial direction R is constant throughout a line T connecting the gravity centers M of the magnet cross-sections at the respective positions from the first gravity center M1 to the second gravity center M2 in the axial direction L. In the present embodiment, the end face of the rotor core 15 on the first axial side L1 is flush with the end face of the permanent magnet (41, 42) on the first axial side L1, and the gravity center M of the end face of the permanent magnet (41, 42) on the first axial side L1 is the first gravity center M1. Further, the end face of the rotor core 15 on the second axial side L2 is flush with the end face of the permanent magnet (41, 42) on the second axial side L2, and the gravity center M of the end face of the permanent magnet (41, 42) on the second axial side L2 is the second gravity center M2. Note that although the permanent magnet (41, 42) is twisted about the center axis A with increasing distance to one side in the axial direction L, the permanent magnet (41, 42) may be twisted with a discontinuity in the axial direction L roughly corresponding to the thickness of a single magnetic sheet 50, in such a manner that the permanent magnet (41, 42) is twisted by a constant amount as the permanent magnet (41, 42) extends in the axial direction L by a distance corresponding to the thickness of a single magnetic sheet 50.

In the present embodiment, the first permanent magnet 41 is twisted about the center axis A so as to be insertable into the first magnet insertion hole 31 from the outside in the axial direction L, and the second permanent magnet 42 is twisted about the center axis A so as to be insertable into the second magnet insertion hole 32 from the outside in the axial direction L. That is, the first permanent magnet 41 has a shape that matches the shape of the first magnet insertion hole 31, and the second permanent magnet 42 has a shape that matches the shape of the second magnet insertion hole 32.

The permanent magnet (41, 42) is formed in advance in a shape that matches the magnet insertion hole (31, 32), and is inserted into the magnet insertion hole (31, 32) from the outside in the axial direction L. Although the permanent magnet (41, 42) is shaped such that the permanent magnet (41, 42) cannot be inserted into the magnet insertion hole (31, 32) by simply being moved in the axial direction L, the permanent magnet (41, 42) can be inserted into the magnet insertion hole (31, 32) by being moved in the axial direction L while being rotated about the center axis A with respect to the stacked structure (20) as will be described below.

As illustrated in FIG. 2, in the present embodiment, the shape of the magnet insertion hole (31, 32) in a cross-section orthogonal to the axial direction L is formed such that the shape of the arrangement area in the radial direction R varies depending on the position in the circumferential direction C. Specifically, the first magnet insertion hole 31 is formed to extend outwardly in the radial direction R with increasing distance to the first circumferential side C1, whereas the second magnet insertion hole 32 is formed to extend outwardly in the radial direction R with increasing distance to the second circumferential side C2. That is, in the present embodiment, the shape of the magnet insertion hole (31, 32) in a cross-section orthogonal to the axial direction L is not formed such that the arrangement area in the radial direction R is constant regardless of the position in the circumferential direction C, unlike a circular arc shape extending with a constant radial width along the circumference about the center axis A. Therefore, the rotor 2 according to the present embodiment is configured such that, even in the case of dividing each permanent magnet (41, 42) into a plurality of magnet portions in the circumferential direction C, it is difficult to divide the permanent magnet (41, 42) into a plurality of magnet portions that can be inserted into the magnet insertion holes (31, 32) by simply being moved in the axial direction L.

Figure 8:
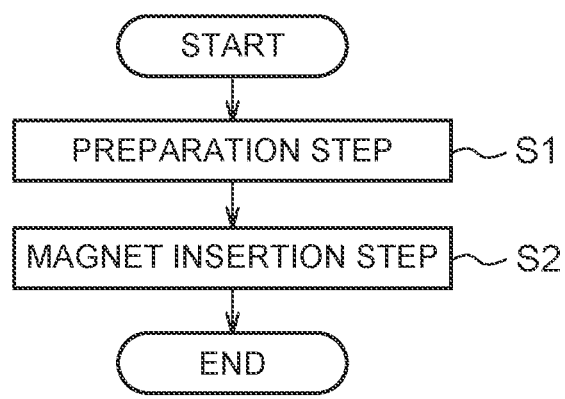
FIG. 8 is a flowchart illustrating a method of manufacturing the rotor according to the embodiment.

Hereinafter, a method of manufacturing the rotor 2 according to the present embodiment will be described. As illustrated in FIG. 8, the method of manufacturing the rotor 2 includes a preparation step S1 and a magnet insertion step S2.

The preparation step S1 is a step of preparing the rotor core 15 and the permanent magnets (41, 42). In this embodiment, in the preparation step S1, the rotor core 15 is prepared that includes the stacked structure 20 including the plurality of magnetic sheets 50 that are shifted from one another by a constant angle to one side in the circumferential direction C with increasing distance to one side in the axial direction L. Further, in the present embodiment, in the preparation step S1, the same number of first permanent magnets 41 as the number of first magnet insertion holes 31 and the same number of second permanent magnets 42 as the number of second magnet insertion holes 32 are prepared. As described above, in the present embodiment, in each cross-section orthogonal to the axial direction L, the first permanent magnet 41 and the second permanent magnet 42 of each magnetic pole P are symmetric with respect to a line as a symmetry axis passing through the center of the magnetic pole P in the circumferential direction C in that cross-section and extending parallel to the radial direction R. Therefore, in the present embodiment, since the second permanent magnet 42 is the same as the first permanent magnet 41 inverted in the axial direction L, permanent magnets of the same shape may be used as both the first permanent magnet 41 and the second permanent magnet 42.

Figure 7:
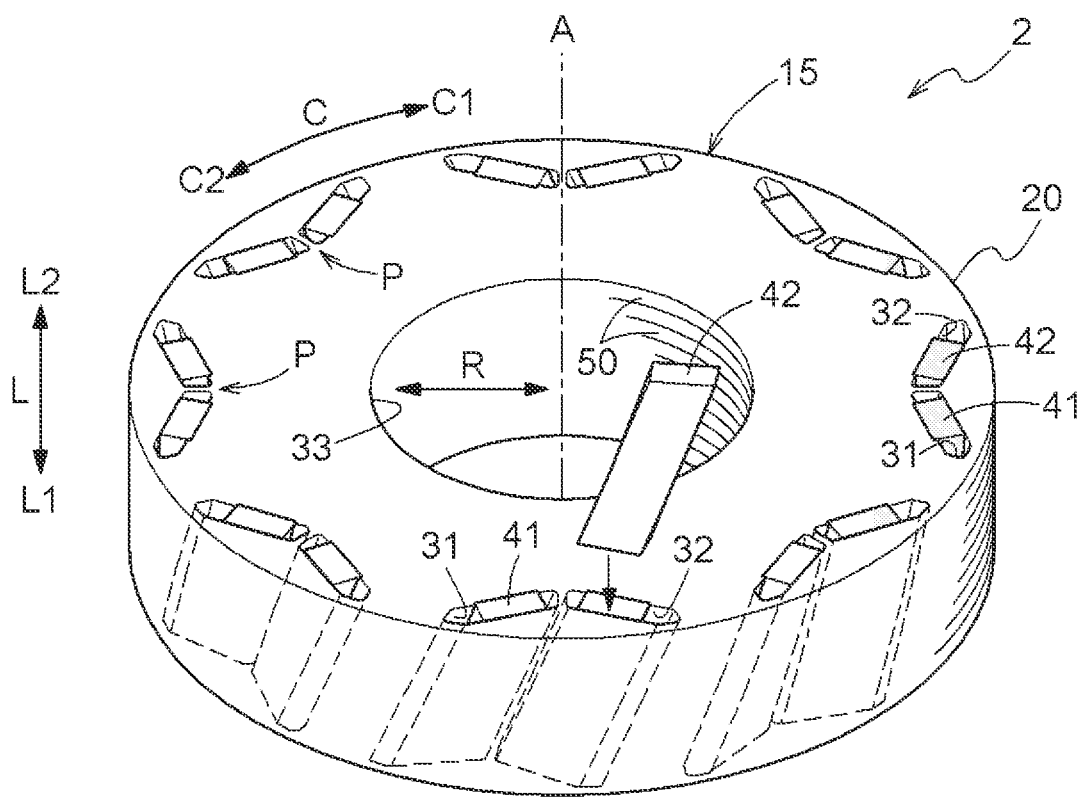
FIG. 7 is a schematic diagram illustrating a magnet insertion step according to the embodiment.

The magnet insertion step S2 is a step of inserting the permanent magnets (41, 42) into the rotor core 15. In the magnet insertion step S2, the permanent magnets (41, 42) are inserted into the magnet insertion holes (31, 32) formed in the rotor core (15) from the outside in the axial direction L. In the present embodiment, in the magnet insertion step S2, the first permanent magnet 41 is inserted into the first magnet insertion hole 31 from the outside in the axial direction L, and the second permanent magnet 42 is inserted into the second magnet insertion hole 32 from the outside in the axial direction L. FIG. 7 illustrates how the second permanent magnet 42 is inserted into the second magnet insertion hole 32 in the magnet insertion step S2.

In the magnet insertion step S2, each permanent magnet (41, 42) is moved in the axial direction L while being rotated about the center axis A with respect to the stacked structure 20. In this step, by rotating at least either the permanent magnet (41, 42) or the stacked structure 20 about the center axis A, the permanent magnet (41, 42) is rotated about the center axis A with respect to the stacked structure 20. In this step, by moving at least either the permanent magnet (41, 42) or the stacked structure 20 in the axial direction L, the permanent magnet (41, 42) is moved in the axial direction L with respect to the stacked structure 20. The amount of rotation of the permanent magnet (41, 42) with respect to the stacked structure 20 about the center axis A is set such that a rotation by the constant angle described above is made for a movement in the axial direction L by a distance corresponding to the thickness of a single magnetic sheet 50, that is, such that a rotation by a position shift amount θ is made for a movement in the axial direction by a distance corresponding to the thickness of the stacked structure 20.

In the example illustrated in FIG. 7, when the permanent magnet (41, 42) are inserted into the magnet insertion hole (31, 32) from the second axial side L2, the permanent magnet (41, 42) is moved to the first axial side L1 with respect to the stacked structure 20 while being rotated about the center axis A to the first circumferential side C1 with respect to the stacked structure 20. In this case, before the end of the permanent magnet (41, 42) on the first axial side L1 is inserted into the magnet insertion hole (31, 32), the permanent magnet (41, 42) is disposed at a position which is on the second axial side L2 with respect to the stacked structure 20 and rotated about the center axis A by the position shift amount θ to the second circumferential side C2 from the position at which the permanent magnet (41, 42) will be disposed in the magnet insertion hole (31, 32). At this point, the end of the permanent magnet (41, 42) on the first axial side L1 is oriented to be insertable into the end of the magnet insertion hole (31, 32) on the second axial side L2. After the end of the permanent magnet (41, 42) on the first axial side L1 is inserted into the magnet insertion hole (31, 32), the permanent magnet (41, 42) is moved to the first axial side L1 with respect to the stacked structure 20 while being rotated about the center axis A to the first circumferential side C1 with respect to the stacked structure 20, so that the whole permanent magnet (41, 42) is disposed inside the magnet insertion hole (31, 32).

Whereas, when the permanent magnet (41, 42) is inserted into the magnet insertion hole (31, 32) from the first axial side L1, the permanent magnet (41, 42) is moved to the second axial side L2 with respect to the stacked structure 20 while being rotated about the center axis A to the second circumferential side C2 with respect to the stacked structure 20. In this case, before the end of the permanent magnet (41, 42) on the second axial side L2 is inserted into the magnet insertion hole (31, 32), the permanent magnet (41, 42) is disposed at a position which is on the first axial side L1 with respect to the stacked structure 20 and rotated about the center axis A by the position shift amount θ to the first circumferential side C1 from the position at which the permanent magnet (41, 42) will be disposed in the magnet insertion hole (31, 32). At this point, the end of the permanent magnet (41, 42) on the second axial side L2 is oriented to be insertable into the end of the magnet insertion hole (31, 32) on the first axial side L1. After the end of the permanent magnet (41, 42) on the second axial side L2 is inserted into the magnet insertion hole (31, 32), the permanent magnet (41, 42) is moved to the second axial side L2 with respect to the stacked structure 20 while being rotated about the center axis A to the second circumferential side C2 with respect to the stacked structure 20, so that the whole permanent magnet (41, 42) is disposed inside the magnet insertion hole (31, 32).

Other Embodiments

In the following, other embodiments of a rotor for a rotary electric machine and a method of manufacturing the same will be described.

(1) In the above embodiment, an example has been described in which the rotor core 15 includes one stacked structure 20. However, the embodiment is not limited to this configuration, and the rotor core 15 may include a plurality of stacked structures 20 coupled in the axial direction L.

Figure 9:
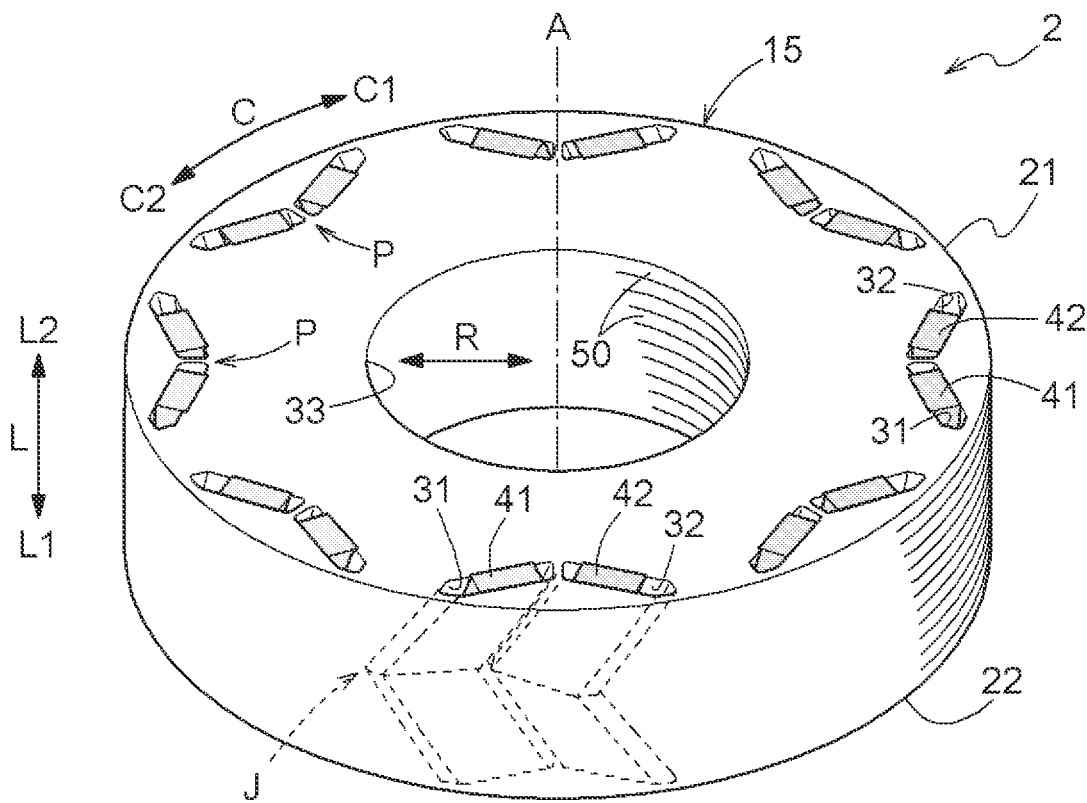
FIG. 9 is a perspective view illustrating a rotor according to another embodiment.
Figure 10:
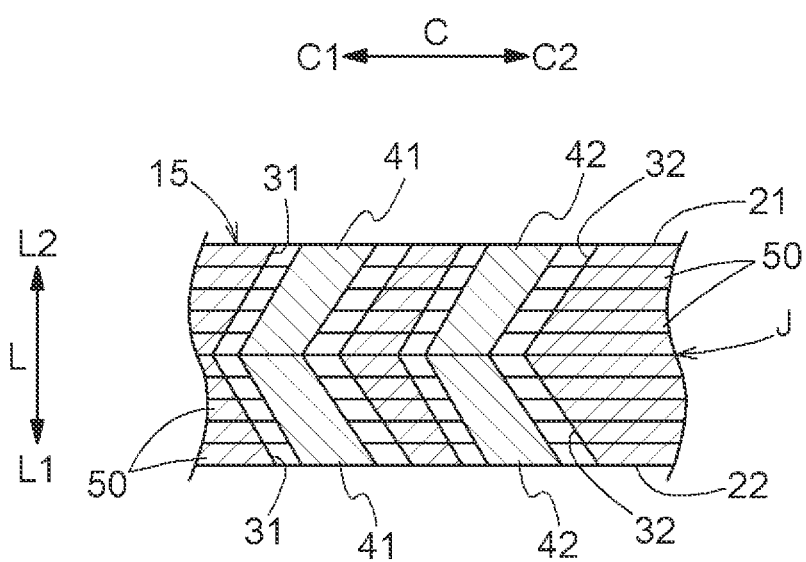
FIG. 10 is a cross-sectional view illustrating a part of the rotor taken along an axial direction according to the other embodiment.

For example, as illustrated in FIGS. 9 and 10, the rotor core 15 may include two stacked structures 20 (a first stacked structure 21 and a second stacked structure 22) coupled in the axial direction L. The side in the circumferential direction C to which the plurality of magnetic sheets 50 are shifted from one another by a constant angle with increasing distance to the one side in the axial direction L is opposite between the two stacked structures, namely, the first stacked structure 21 and the second stacked structure 22. In the example illustrated in FIG. 9, the first stacked structure 21 is configured such that a plurality of magnetic sheets 50 are shifted in position from one another by a constant angle to the first circumferential side C1 with increasing distance to the first axial side L1, and the second stacked structure 22 is configured such that a plurality of magnetic sheets 50 are shifted in position from one another by a constant angle to the second circumferential side C2 with increasing distance to the first axial side L1. Further, the relative positions of the first stacked structure 21 and the second stacked structure 22 in the circumferential direction C are set such that the first magnet insertion hole 31 and the second magnet insertion hole 32 of the first stacked structure 21 communicate with the first magnet insertion hole 31 and the second magnet insertion hole 32 of the second stacked structure 22, respectively, in the axial direction L at a joint J between the first stacked structure 21 and the second stacked structure 22. In this example, the constant angle for the first stacked structure 21 and the constant angle for the second stacked structure 22 are the same size. Further, in the present example, the first stacked structure 21 and the second stacked structure 22 have the same thickness in the axial direction L. Specifically, the first stacked structure 21 and the second stacked structure 22 include the same number of magnetic sheets 50 stacked in the axial direction L.

When the rotor 2 illustrated in FIGS. 9 and 10 is manufactured, the magnet insertion step S2 may be performed after coupling two stacked structures 20, or before coupling two stacked structures 20. In the former case, the insertion direction of the permanent magnets (41, 42) is limited to one side in the axial direction L.

(2) In the above embodiment, an example has been described in which each magnetic pole P is formed by two permanent magnets (41, 42). However, the embodiment is not limited to this configuration, and each magnetic pole P may be formed by a single permanent magnet or three or more permanent magnets.

(3) The features disclosed in any of the above embodiments may be applied in combination with the features disclosed in other embodiments as long as no inconsistency arises (such combinations includes combinations of embodiments described as other embodiments). Regarding other features as well, the embodiments disclosed herein are merely examples in all respects. Accordingly, various modifications may be appropriately made without departing from the scope and spirit of the present disclosure.

SUMMARY OF EMBODIMENTS

The following provides a summary of the rotor for a rotary electric machine and the method of manufacturing the same described above.

A rotor (2) for a rotary electric machine includes a rotor core (15) and permanent magnets (41, 42) embedded in the rotor core (15). The rotor core (15) includes a stacked structure (20) including a plurality of magnetic sheets (50) stacked in an axial direction (L) along a center axis (A). Each of the plurality of magnetic sheets (50) has through holes (51, 52) for insertion of the permanent magnets (41, 42) at a plurality of positions in a circumferential direction (C). A relative positional relationship of the plurality of through holes (51, 52) with respect to the center axis (A) and shapes of the through holes (51, 52) in each of the magnetic sheets (50) are common to the plurality of magnetic sheets (50). The stacked structure (20) is configured such that the plurality of magnetic sheets (50) are shifted in position from one another by a constant angle to one side in the circumferential direction (C) with increasing distance to one side in the axial direction (L). Magnet insertion holes (31, 32) are formed, each defined by the plurality of through holes (51, 52) communicating with each other in the axial direction (L) across the plurality of magnetic sheets (50). Each of the permanent magnets (41, 42) is twisted about the center axis (A) so as to be placed into a corresponding one of the magnet insertion holes (31, 32), each having opposite ends in the axial direction (L) that are shifted from each other by an angle corresponding to the constant angle, from outside in the axial direction (L).

According to this configuration, the rotor core (15) includes the stacked structure (20) configured such that the plurality of magnetic sheets (50) are shifted in position from one another by a constant angle to one side in the circumferential direction (C) with increasing distance to one side in the axial direction (L), and the magnet insertion holes (31, 32) are formed, each defined by the plurality of through holes (51, 52) communicating with each other in the axial direction (L) across the plurality of magnetic sheets (50). Accordingly, it is possible to form a continuous skew structure divided into the same number of portions as the number of magnetic sheets (50) in the stacked structure (20), and to further reduce cogging torque and torque ripple while suppressing a reduction in performance of the rotary electric machine (1) such as a reduction in output torque.

Further, according to the above configuration, each of the permanent magnets (41, 42) is twisted about the center axis (A) so as to be placed into a corresponding one of the magnet insertion holes (31, 32) from the outside in the axial direction (L). Therefore, it is possible to use the permanent magnets (41, 42) each having a continuous shape in the axial direction (L) while forming the continuous skew structure in the stacked structure (20) as described above. Accordingly, it is possible to suppress an increase in the number of components while providing a continuous skew structure.

Thus, according to the above configuration, it is possible to provide the rotor (2) with a skew structure for further reducing cogging torque and torque ripple.

The stacked structure (20) of the rotor core (15) may include two stacked structures (21, 22) coupled in the axial direction (L), and a side in the circumferential direction (C) to which the plurality of magnetic sheets (50) are shifted from one another by the constant angle with increasing distance to the one side in the axial direction (L) may be opposite between the two stacked structures (21, 22).

According to this configuration, a V-shaped skew structure can be formed by the two stacked structures (21, 22). Thus, for example, by adjusting the angle of the V-shape, a specific high-frequency component contained in the magnetic flux density distribution formed in the air gap between the rotor core (15) and the stator core (10) can be reduced. Further, for example, the direction of the thrust in the axial direction (L) that can be generated in the stacked structure (20) due to provision of the skew structure can be made opposite between the two stacked structures (21, 22), and therefore it is possible to suppress the bearings (5) supporting the rotor core (15) from wearing due to the thrust load.

Further, the rotor (2) may be used for the rotary electric machine (1) that includes a stator core (10) including a plurality of teeth (12) formed in the circumferential direction (L), and extending in the axial direction (L); the rotor core (15) may be disposed to face the stator core (10) in a radial direction; and when a relative position in the circumferential direction (C) with respect to an end of each of the teeth (12) on a rotor core (15) side in the radial direction (R) is defined as an object relative position, a shift amount between object relative positions of opposite ends of each of the magnet insertion holes (31, 32) in the axial direction (L) is equal to an arrangement pitch (D) of the teeth (12) in the circumferential direction (C).

According to this configuration, the shift amount between the object relative positions can be set such that the center of each magnetic pole (P) in the circumferential direction (C), which is formed in the rotor (2) so as to extend in the direction inclined with respect to the axial direction (L), faces the one of the slots (11) and one of the teeth (12) that are adjacent in the circumferential direction (C), in the radial direction (R), at every position in the circumferential direction (C). Therefore, it is possible to appropriately distribute the magnetic resistance between the rotor (2) and the stator (3) in the circumferential direction (C), and thus to further reduce cogging torque. Further, according to the above configuration, it is possible to suppress a reduction in performance of the rotary electric machine (1) due to an excessive increase in the shift amount between the object relative positions.

A rotor (2) for a rotary electric machine includes a rotor core (15) and permanent magnets (41, 42) embedded in the rotor core (15). The rotor core (15) includes a stacked structure (20) including a plurality of magnetic sheets (50) stacked in an axial direction (L) along a center axis (A) Each of the plurality of magnetic sheets (50) has through holes (51, 52) for insertion of the permanent magnets (41, 42) at a plurality of positions in a circumferential direction (C). A relative positional relationship of the plurality of through holes (51, 52) with respect to the center axis (A) and shapes of the through holes (51, 52) in each of the magnetic sheets (50) are common to the plurality of magnetic sheets (50). The stacked structure (20) is configured such that the plurality of magnetic sheets (50) are shifted in position from one another by a constant angle to one side in the circumferential direction (C) with increasing distance to one side in the axial direction (L). Magnet insertion holes (31, 32) are formed, each defined by the plurality of through holes (51, 52) communicating with each other in the axial direction (L) across the plurality of magnetic sheets (50). A cross-section of each of the permanent magnets (41, 42) orthogonal to the center axis (L) is defined as a magnet cross-section, and positions of gravity centers of magnet cross-sections at respective positions in the axial direction (L) corresponding to the plurality of magnetic sheets (50) are defined as corresponding gravity center positions. A distance between each of the corresponding gravity center positions and the center axis (L) in the radial direction (R) is constant throughout a length of each of the permanent magnets (41, 42) in the axial direction. The corresponding gravity center positions are shifted from one another by the same angle as the constant angle to the one side (C1) in the circumferential direction with increasing distance to the one side (L1) in the axial direction.

According to this configuration, the rotor core (15) includes the stacked structure (20) configured such that the plurality of magnetic sheets (50) are shifted in position from one another by a constant angle to one side in the circumferential direction (C) with increasing distance to one side in the axial direction (L), and the magnet insertion holes (31, 32) are formed, each defined by the plurality of through holes (51, 52) communicating with each other in the axial direction (L) across the plurality of magnetic sheets (50). Accordingly, it is possible to form a continuous skew structure divided into the same number of portions as the number of magnetic sheets (50) in the stacked structure (20), and to further reduce cogging torque and torque ripple while suppressing a reduction in performance of the rotary electric machine (1) such as a reduction in output torque.

Further, according to the above configuration, the permanent magnets (41, 42) have continuous shapes in the axial direction (L) corresponding to the shapes of the respective magnet insertion holes (31, 32) in the stacked structure (20) having the continuous skew structure as described above, and therefore it is possible to further reduce cogging torque and torque ripple.

Thus, according to the above configuration, it is possible to provide the rotor (2) with a skew structure for further reducing cogging torque and torque ripple.

Further, the magnet cross-section may be rectangular, and lengths of a short side and a long side of the magnet cross-section at each of the positions in the axial direction (L) may be constant throughout the length of each of the permanent magnets (41, 42) in the axial direction (L).

According to this configuration, the permanent magnet is relatively easily molded, and is easily appropriately placed in the magnet insertion hole (31, 32) formed in the stacked structure (20).

A method of manufacturing a rotor (2) for a rotary electric machine, the rotor (2) including a rotor core (15) and permanent magnets (41, 42) embedded in the rotor core (15), includes: a preparation step (S1) of preparing the rotor core (15) and the permanent magnets (41, 42); and a magnet insertion step (S2) of inserting the permanent magnets (41, 42) into the rotor core (15). The rotor core (15) includes a stacked structure (20) including a plurality of magnetic sheets (50) stacked in an axial direction (L) along a center axis (A). Each of the plurality of magnetic sheets (50) has through holes (51, 52) for insertion of the permanent magnets (41, 42) at a plurality of positions in a circumferential direction (C). A relative positional relationship of the plurality of through holes (51, 52) with respect to the center axis (A) and shapes of the through holes (51, 52) in each of the magnetic sheets (50) are common to the plurality of magnetic sheets (50). The stacked structure (20) is configured such that the plurality of magnetic sheets (50) are shifted in position from one another by a constant angle to one side in the circumferential direction (C) with increasing distance to one side in the axial direction (L). Magnet insertion holes (31, 32) are formed, each defined by the plurality of through holes (51, 52) communicating with each other in the axial direction (L) across the plurality of magnetic sheets (50). Each of the permanent magnets (41, 42) is twisted about the center axis (A) so as to be insertable into a corresponding one of the magnet insertion holes (31, 32) from outside in the axial direction (L). In the magnet insertion step (S2), the permanent magnets (41, 42) are moved in the axial direction (L) while being rotated about the center axis (A) with respect to the stacked structure (20).

According to this configuration, the rotor (2) can be manufactured by appropriately inserting the permanent magnets (41, 42), each being twisted about the center axis (A) so as to be insertable into a corresponding one of the magnet insertion holes (31, 32) from outside in the axial direction (L), into the stacked structure (20) configured such that the plurality of magnetic sheets (50) are shifted in position from one another by a constant angle to one side in the circumferential direction (C) with increasing distance to one side in the axial direction (L), in the magnet insertion step (S2). That is, the rotor (2) is manufactured using the permanent magnets (41, 42) each having a continuous shape in the axial direction (L) while forming a continuous skew structure divided into the same number of portions as the number of magnetic sheets (50) in the stacked structure (20), and therefore the magnet insertion step (S2) is simplified as compared with the case of using permanent magnets divided in the axial direction (L) as the permanent magnets (41, 42).

Thus, according to the above configuration, as mentioned above, it is possible to appropriately manufacture the rotor (2) having a skew structure for reducing cogging torque and torque ripple while suppressing both a reduction in performance of the rotary electric machine (1) and an increase in the number of components.

The rotor for a rotary electric machine and the method of manufacturing the same according to the present disclosure only need to provide at least one of the above effects.

The invention claimed is:

1. A rotor for a rotary electric machine, comprising:
   a rotor core; and
   a plurality of permanent magnets embedded in the rotor core, wherein:
   the rotor core includes a stacked structure including a plurality of magnetic sheets stacked in an axial direction along a center axis;
   each of the plurality of magnetic sheets has through holes for insertion of the plurality of permanent magnets at a plurality of positions in a circumferential direction;
   a relative positional relationship of the plurality of through holes with respect to the center axis and shapes of the through holes in each of the magnetic sheets are common to the plurality of magnetic sheets;
   the stacked structure is configured such that the plurality of magnetic sheets are shifted in position from one another by a constant angle to one side in the circumferential direction with increasing distance to one side in the axial direction;
   magnet insertion holes are formed, each defined by the plurality of through holes communicating with each other in the axial direction across the plurality of magnetic sheets;
   a cross-section of each of the plurality of permanent magnets orthogonal to the center axis is defined as a magnet cross-section, and positions of gravity centers of magnet cross-sections at respective positions in the axial direction corresponding to the plurality of magnetic sheets are defined as corresponding gravity center positions;
   a distance between each of the corresponding gravity center positions and the center axis in the radial direction is constant throughout a length of each of the plurality of permanent magnets in the axial direction;
   the corresponding gravity center positions are shifted from one another by the same angle as the constant angle to the one side in the circumferential direction with increasing distance to the one side in the axial direction;
   each of the plurality of permanent magnets is twisted about the center axis from a first end to a second end opposite the first end of each of the plurality of permanent magnets so as to be placed into a corresponding one of the magnet insertion holes, each having opposite ends in the axial direction that are shifted from each other by an angle corresponding to the constant angle, from outside in the axial direction;
   the magnet cross-section is rectangular, and lengths of a short side and a long side of the magnet cross-section at each of the positions in the axial direction are constant throughout the length of each of the plurality of permanent magnets in the axial direction;
   each magnetic pole is formed by at least two or more permanent magnets of the plurality of permanent magnets;
   permanent magnets of the plurality of permanent magnets forming one magnetic pole are symmetric with respect to a line as a symmetry axis passing through the center of the magnetic pole in the circumferential direction in that cross-section and extending parallel to the radial direction; and
   each magnetic sheet of the plurality of magnetic sheets is formed of magnetic sheets having the same shape.

* * * * *